US006983970B2

(12) United States Patent
Bateman

(10) Patent No.: US 6,983,970 B2
(45) Date of Patent: Jan. 10, 2006

(54) FRAMELESS LOAD RESTRAINING VEHICULAR BARRIER DEVICE

(75) Inventor: Brian Bateman, Rochester Hills, MI (US)

(73) Assignee: Exco Automotive Solutions, L.P., Troy, MI (US)

( * ) Notice: Subject to any disclaimer, the term of this patent is extended or adjusted under 35 U.S.C. 154(b) by 0 days.

(21) Appl. No.: 10/292,015

(22) Filed: Nov. 12, 2002

(65) Prior Publication Data

US 2003/0090119 A1 May 15, 2003

Related U.S. Application Data

(60) Provisional application No. 60/337,588, filed on Nov. 12, 2001.

(51) Int. Cl.
*B60R 21/06* (2006.01)
(52) U.S. Cl. .................. 296/24.43; 410/118; 410/129
(58) Field of Classification Search .............. 296/24.1, 296/37.16, 24.3, 24.4, 24.43; 410/101, 102, 410/103, 106, 117, 118, 129, 142, 77; 280/748, 280/749; 160/327, 351; 224/42.33, 42.34
See application file for complete search history.

(56) References Cited

U.S. PATENT DOCUMENTS

| 1,837,537 | A |   | 12/1931 | Emerson |              |
|-----------|---|---|---------|---------|--------------|
| 2,532,713 | A |   | 6/1950  | Gottfried | ............. 155/179 |
| 2,665,754 | A | * | 1/1954  | Claussen et al. | ............ 160/354 |
| 2,669,402 | A |   | 2/1954  | Del Mar | ............. 244/121 |
| 2,705,461 | A |   | 4/1955  | Campbell | ............. 105/369 |
| 2,706,819 | A | * | 4/1955  | McClure | ............. 5/94 |
| 2,950,691 | A |   | 6/1958  | Huber | ............. 105/369 |
| 2,854,931 | A |   | 10/1958 | Campbell | ............. 105/369 |
| 2,986,315 | A |   | 5/1961  | Zimmerman | ............. 224/42.32 |
| 2,997,331 | A |   | 8/1961  | Kudner | ............. 296/24 |
| 3,044,800 | A |   | 7/1962  | Wicker | ............. 280/150 |
| 3,049,373 | A |   | 8/1962  | Biggers | ............. 296/106 |
| 3,098,562 | A |   | 7/1963  | Simmons | ............. 206/46 |
| 3,099,313 | A |   | 7/1963  | Peck et al. | ............. 160/243 |

(Continued)

FOREIGN PATENT DOCUMENTS

DE 2759777 C2 3/1979

(Continued)

OTHER PUBLICATIONS

Approval of Seats, Anchorage United Nations Agreement Issue 4: Regulation No. 17.

(Continued)

*Primary Examiner*—H. Gutman
(74) *Attorney, Agent, or Firm*—Young & Basile, P.C.

(57) ABSTRACT

A barrier device or cargo net positionable between a rear seat of a vehicle passenger compartment and a cargo area of the vehicle. The barrier device can include a window portion and a solid portion. The window portion can be positioned across an open space above the seat and below the headliner of the vehicle. The solid portion can be positionable behind the seat. The body of the barrier device can be formed with a first portion and a second portion, the first portion being thicker or formed of more layers of material than the second portion. The thicker portion of the body of the barrier device can be positioned across the open space or behind the seat back. The barrier device is releasably attachable to the top of the interior of the vehicle and the bottom of the interior of the vehicle. The barrier body can also include means to render the top, bottom, first side or second side taut.

35 Claims, 4 Drawing Sheets

U.S. PATENT DOCUMENTS

| | | | |
|---|---|---|---|
| 3,169,781 A | 2/1965 | Abruzzino | 280/150 |
| 3,190,686 A | 6/1965 | Smiler | 296/24 |
| 3,256,837 A | 6/1966 | Blatt | 105/376 |
| 3,314,379 A | 4/1967 | Krokos | 105/369 |
| 3,336,069 A | 8/1967 | Bayer et al. | 296/24 |
| 3,367,707 A | 2/1968 | Merriweather | 296/24 |
| 3,423,121 A * | 1/1969 | Lipkin | 296/24.4 |
| 3,438,673 A | 4/1969 | Nelson | 296/37 |
| 3,479,244 A | 11/1969 | Burnett | 161/58 |
| 3,486,723 A | 12/1969 | Harrison | 244/118 |
| 3,527,984 A | 9/1970 | Flanagan et al. | 317/9 |
| 3,534,998 A | 10/1970 | Johnson et al. | 296/24 |
| 3,575,777 A | 4/1971 | Allport | 161/57 |
| 3,612,301 A | 10/1971 | Peacock | 214/10.5 R |
| 3,633,936 A | 1/1972 | Huber | 280/150 B |
| 3,662,229 A | 5/1972 | Graff et al. | 317/148.5 R |
| 3,695,698 A | 10/1972 | Trump | 297/290 |
| 3,762,495 A | 10/1973 | Usui et al. | 180/103 |
| 3,762,760 A | 10/1973 | Tomson et al. | 296/100 |
| 3,767,066 A | 10/1973 | Martin et al. | 214/10.5 R |
| 3,767,253 A | 10/1973 | Kluetsch | 296/24 R |
| 3,782,758 A | 1/1974 | Williamson, III | 280/179 R |
| 3,837,422 A | 9/1974 | Schlanger | 180/91 |
| 3,891,263 A | 6/1975 | Orsulak | 296/24 R |
| 3,910,625 A | 10/1975 | Menard | 296/37 R |
| RE28,788 E | 4/1976 | Williamson, III | 280/179 R |
| 3,986,656 A | 10/1976 | November | 229/15 |
| 4,000,344 A | 12/1976 | Dilbey | 428/255 |
| 4,096,807 A | 6/1978 | Woodward | 105/467 |
| 4,121,356 A | 10/1978 | Gambon | 35/11 R |
| 4,139,231 A | 2/1979 | Lang et al. | 296/37.16 |
| 4,168,667 A | 9/1979 | Loomis | 105/467 |
| 4,173,369 A | 11/1979 | Roggin | 296/24 R |
| 4,189,056 A | 2/1980 | Majewski | 211/195 |
| 4,213,636 A | 7/1980 | King | 280/749 |
| 4,215,895 A | 8/1980 | Phillips | 296/202 |
| 4,222,601 A | 9/1980 | White et al. | 296/37.16 |
| 4,226,348 A | 10/1980 | Dottor et al. | 224/42.42 |
| 4,265,577 A | 5/1981 | Loomis | 410/118 |
| 4,275,913 A | 6/1981 | Marcus | 296/37.1 |
| 4,368,902 A | 1/1983 | McDowell | 280/749 |
| 4,396,325 A | 8/1983 | Joice-Cavanagh | 410/129 |
| 4,436,466 A * | 3/1984 | Marino | 410/118 |
| 4,538,737 A | 9/1985 | Delaney | 211/71 |
| 4,554,202 A | 11/1985 | Kamei et al. | 428/225 |
| 4,651,620 A | 3/1987 | Lyons | 87/12 |
| 4,671,557 A | 6/1987 | Lemp | 296/37.16 |
| 4,671,988 A | 6/1987 | Dowell et al. | 428/226 |
| 4,688,842 A * | 8/1987 | Arbenius | |
| 4,718,584 A | 1/1988 | Schoeny | 224/42.42 |
| 4,728,141 A | 3/1988 | Motozawa et al. | 296/37.16 |
| 4,763,944 A | 8/1988 | Fry et al. | 296/50 |
| 4,781,498 A | 11/1988 | Cox | 410/118 |
| 4,797,311 A | 1/1989 | Kemp | 428/92 |
| 4,818,007 A * | 4/1989 | Mahoney | 296/24.1 |
| 4,826,193 A * | 5/1989 | Davis | 280/304.1 |
| 4,846,610 A | 7/1989 | Schoenleben | 410/96 |
| 4,852,194 A | 8/1989 | Langan | 5/427 |
| 4,854,632 A | 8/1989 | Kreuze et al. | 296/37.12 |
| 4,900,204 A | 2/1990 | Summers | 410/97 |
| 4,915,437 A | 4/1990 | Cherry | 296/37.6 |
| 4,919,467 A | 4/1990 | Guimelli | 296/24.1 |
| 4,932,704 A | 6/1990 | Ament | 290/36.16 |
| 4,957,250 A | 9/1990 | Hararat-Tehrani | 244/118.1 |
| 4,964,771 A | 10/1990 | Callihan | 410/118 |
| 4,981,225 A | 1/1991 | Cole | 211/183 |
| 5,011,208 A | 4/1991 | Lewallen | 296/37.16 |
| 5,011,349 A * | 4/1991 | McAndrews | 410/102 |
| 5,012,963 A | 5/1991 | Rosenbaum | 224/42.46 R |
| 5,025,964 A | 6/1991 | Phirippidis | 224/42.42 |
| 5,026,231 A | 6/1991 | Moore | 410/118 |
| 5,035,471 A | 7/1991 | Ackerman | 312/291 |
| 5,040,711 A | 8/1991 | Niederhauser et al. | 224/42.46 R |
| 5,040,934 A | 8/1991 | Ross | 410/97 |
| 5,053,269 A | 10/1991 | Ducol et al. | 428/253 |
| 5,058,786 A | 10/1991 | Politi | 224/42.32 |
| 5,090,856 A | 2/1992 | Moore | 410/118 |
| D325,016 S | 3/1992 | Moore | D12/155 |
| 5,102,103 A | 4/1992 | Putnam | 256/12 |
| 5,114,288 A | 5/1992 | Langendorf et al. | 410/34 |
| 5,118,019 A | 6/1992 | Harrison | 224/42.46 R |
| 5,121,958 A * | 6/1992 | Goeden et al. | 296/37.1 |
| 5,139,375 A | 8/1992 | Franchuk | 410/105 |
| 5,161,700 A | 11/1992 | Stannis et al. | 211/175 |
| 5,167,433 A | 12/1992 | Ryan | 296/37.1 |
| 5,170,829 A | 12/1992 | Duncan et al. | 160/84.1 |
| 5,186,587 A | 2/1993 | Moore | 410/118 |
| 5,207,260 A | 5/1993 | Commesso | 160/135 |
| 5,265,993 A | 11/1993 | Wayne | 410/129 |
| 5,288,122 A | 2/1994 | Pilhall | 296/24.1 |
| 5,300,165 A | 4/1994 | Sugikawa | 156/150 |
| 5,316,358 A | 5/1994 | Payne et al. | 296/37.6 |
| 5,328,310 A | 7/1994 | Lockney | 410/97 |
| 5,340,004 A | 8/1994 | Moore | 224/42.46 R |
| 5,348,433 A | 9/1994 | Watson | 411/347 |
| 5,353,891 A | 10/1994 | Griek et al. | 182/45 |
| 5,368,210 A | 11/1994 | Wotring | 224/42.46 R |
| 5,392,972 A | 2/1995 | Caruso et al. | 224/42.034 |
| 5,419,471 A | 5/1995 | Polumbaum et al. | 224/42.42 |
| 5,427,486 A | 6/1995 | Green | 410/118 |
| 5,433,991 A | 7/1995 | Boyd et al. | 420/193 |
| 5,437,474 A | 8/1995 | Ament | 280/749 |
| 5,444,836 A | 8/1995 | Hollingsworth et al. | 395/135 |
| 5,452,973 A | 9/1995 | Arvin | 410/118 |
| 5,458,447 A | 10/1995 | Clason | 410/100 |
| 5,484,091 A | 1/1996 | Malinowski et al. | 224/542 |
| 5,501,384 A | 3/1996 | Wisniewski | 224/539 |
| 5,535,931 A | 7/1996 | Barlow et al. | 224/404 |
| 5,538,306 A | 7/1996 | Ament | 296/37.1 |
| 5,542,591 A | 8/1996 | Moore et al. | 224/545 |
| 5,551,726 A | 9/1996 | Ament | 280/749 |
| 5,586,844 A | 12/1996 | Nyman | 407/105 |
| 5,618,077 A | 4/1997 | Ament et al. | 296/37.16 |
| 5,673,890 A | 10/1997 | Duesterberg | 248/311.2 |
| 5,676,415 A | 10/1997 | Ament et al. | 296/37.16 |
| D387,014 S | 12/1997 | Matoba | D11/218 |
| 5,695,217 A * | 12/1997 | Ament et al. | 280/749 |
| 5,758,811 A | 6/1998 | Aumiller et al. | 224/563 |
| 5,772,370 A | 6/1998 | Moore | 410/100 |
| 5,795,005 A | 8/1998 | Garfias et al. | 296/37.5 |
| 5,800,011 A | 9/1998 | Spykerman | 297/188.19 |
| 5,807,045 A | 9/1998 | Profit | 410/116 |
| 5,820,187 A | 10/1998 | Ament et al. | 296/24.1 |
| 5,845,888 A | 12/1998 | Anderson | 248/311.2 |
| 5,876,064 A | 3/1999 | Ament et al. | 280/749 |
| 5,876,090 A | 3/1999 | Kawaguti | 296/208 |
| 5,924,611 A | 7/1999 | Mizuno | 224/42.4 |
| 5,926,927 A | 7/1999 | Winkler | 24/585 |
| 5,954,380 A | 9/1999 | Ament et al. | 296/24.1 |
| 5,961,171 A | 10/1999 | Iijima | 296/37.16 |
| 5,961,172 A | 10/1999 | Ament et al. | 296/37.16 |
| 5,967,584 A | 10/1999 | McCarthy et al. | 296/37.16 |
| 5,967,720 A | 10/1999 | Profit | 410/116 |
| 5,971,433 A | 10/1999 | Ament et al. | 280/749 |
| 5,994,242 A | 11/1999 | Arthurs | 442/43 |
| 6,015,071 A | 1/2000 | Adomeit et al. | 224/43.32 |
| 6,017,174 A * | 1/2000 | Ross et al. | 410/100 |
| 6,027,155 A | 2/2000 | Wisniewski et al. | 296/37.1 |
| 6,068,232 A * | 5/2000 | Bentley | 296/65.16 |
| 6,099,222 A * | 8/2000 | Moore | 410/100 |
| 6,119,760 A * | 9/2000 | Poole | 296/24.1 |
| 6,125,908 A | 10/2000 | Ament et al. | 160/323.1 |
| 6,183,028 B1 | 2/2001 | Ament et al. | 296/24.1 |

| | | | |
|---|---|---|---|
| 6,302,463 B1 | 10/2001 | Moore et al. ............... 296/24.1 |
| 6,341,812 B1 * | 1/2002 | Knoll ..................... 296/180.1 |
| 6,443,489 B1 * | 9/2002 | Ehrenberger et al. ...... 296/24.1 |
| 6,460,912 B2 | 10/2002 | Moore et al. ............... 296/24.1 |
| 6,474,713 B1 | 11/2002 | Ruck et al. ................ 296/24.1 |
| 6,502,859 B1 * | 1/2003 | Svetlik ..................... 296/24.1 |
| 6,554,339 B1 * | 4/2003 | Moore ...................... 296/24.1 |
| 6,557,926 B1 * | 5/2003 | Bacher et al. ............. 296/24.1 |
| 6,565,143 B2 * | 5/2003 | Okamoto ................... 296/24.1 |
| 6,626,462 B2 * | 9/2003 | Saczalski et al. ........... 280/749 |
| 2001/0033084 A1 * | 10/2001 | Murray et al. ............. 296/24.1 |
| 2002/0096900 A1 * | 7/2002 | Moore ...................... 296/24.1 |

FOREIGN PATENT DOCUMENTS

| | | |
|---|---|---|
| DE | 2854505 | 6/1980 |
| DE | 223680 A1 | 6/1985 |
| DE | 3419758 A1 | 11/1985 |
| DE | 3738931 | 5/1989 |
| DE | 4300904 | 7/1993 |
| DE | 44 10681 A1 | 10/1994 |
| DE | 19520584 | 12/1996 |
| DE | 19641794 A1 | 4/1997 |
| DE | 29704724 U1 | 9/1997 |
| DE | 19711868 C1 | 8/1998 |
| DE | 19735463 | 3/1999 |
| EP | 0203824 | 12/1986 |
| EP | 0642 955 A1 | 8/1994 |
| EP | 0642955 * | 3/1995 |
| EP | 0659611 | 6/1995 |
| EP | 0995641 | 4/2000 |
| FR | 2470033 | 6/1981 |
| FR | 2714342 | 6/1995 |
| FR | 2768102 | 3/1999 |
| GB | 1056976 | 2/1967 |
| GB | 1175970 | 1/1970 |
| GB | 2033849 | 5/1980 |
| GB | 2111439 | 7/1983 |
| GB | 2196907 | 5/1988 |
| GB | 2206548 | 1/1989 |
| GB | 2273481 | 6/1994 |
| JP | 61193949 | 8/1986 |
| JP | 4002534 | 1/1992 |
| WO | WO 94/12370 | 6/1994 |

OTHER PUBLICATIONS

Merkur XR4Ti 1985 Owners Guide, Jun. 1984.

* cited by examiner

FRAMELESS LOAD RESTRAINING VEHICULAR BARRIER DEVICE

CROSS-REFERENCE TO RELATED APPLICATIONS

This application claims the benefit of the provisional patent application No. 60/337,588 for a FRAMELESS LOAD RESTRAINING VEHICULAR BARRIER DEVICE, filed on Nov. 12, 2001. This claim is made under 35 U.S.C. §119(e); 37 C.F.R. §1.78; and 65 FR 50093.

FIELD OF THE INVENTION

The present invention relates generally to vehicular barrier devices, and, more particularly, to such a barrier device which is relatively lightweight, while advantageously aiding in preventing the inadvertent passage of cargo from the trunk to the passenger compartment.

BACKGROUND OF THE INVENTION

Manufacturers of passenger and cargo vehicles, such as automobiles (including SUVs and the like), trucks, trains, aircraft, marine craft, and the like, continuously strive to make the vehicles more fuel efficient while at the same time improving the safety for passengers and/or operators of the vehicles. One way in which fuel may be conserved is to make the vehicle weigh less. As such, particularly in automobiles, alternative materials such as polymeric materials have replaced metal in many areas of the vehicle.

Many years ago, manufacturers generally eliminated the heavy, metal bulkhead between the trunk and passenger compartments which had often been found in conventional sedan-type automobiles. Further, due to the desirability of having a means for transporting oversized cargo, manufacturers began to design and sell fold-down seats to accommodate pass-through cargo from the trunk to the passenger compartments. However, safety requirements relating to the restraint of cargo within the trunk under certain conditions sometimes necessitated finding a replacement for the metal bulkhead. Further, it was unfortunately discovered that in certain instances some latching mechanisms for fold-down seats at times were not strong enough to withstand forces experienced under some frontal crash conditions. Due to passengers being restrained from bending over due to the 3 point passenger passive restraint systems, such latching mechanism failures could possibly in some cases contribute to injury of passengers.

Although many lighter materials exist, these materials generally do not pass safety requirements since they often fail in restraining cargo in the trunk from inadvertently entering the passenger compartment. The suitable replacement materials which do exist are either cost prohibitive, or for strength they must be much wider than standard sheet metal used—as such, they therefore cannot fit within the space constraints of the automobile.

One such replacement is disclosed in U.S. Pat. No. 5,026,231 issued in 1991. The automotive barrier net disclosed therein was a suitable metal bulkhead replacement; and in certain situations, may yet be a suitable replacement therefor. However, since the invention of that barrier net, more stringent safety standards have been proposed relating to the restraint of cargo within the trunk area.

An example of such a requirement is found in the United Nations "Agreement Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions," Addendum 16: Regulation No. 17, Revision 3, Amendment 4, Feb. 11, 2000, which publication is incorporated herein by reference in its entirety. Regulation No. 17 is entitled "Uniform Provisions Concerning the Approval of Vehicles with regard to the Seats, their Anchorages and any Head Restraints."

Annex 9 of Regulation No. 17 defines the test procedure for devices intended to protect the occupants against displacement of luggage. Paragraph 2 of Annex 9 of Reg. No. 17 specifies that two blocks each having a mass of 18 kg are to be placed in the trunk area. In a vehicle having an open area between the cargo and passenger space (e.g. in a stationwagon), a 10 kg block is placed in the cargo area, but upwardly so as to be directly adjacent an installed barrier device. Paragraph 2 of Annex 7 of Reg. No. 17 defines the conditions for the standardized vehicular crash test; and specifies that the speed on impact shall be between 48.3 km/h and 53.1 km/h. Paragraph 6.3.1 of Reg. No. 17 states that a longitudinal horizontal deceleration of not less than 20 g (1 g being approximately equal to 9.8 m/s$^2$) shall be applied for 30 milliseconds in the forward direction to the whole shell of the vehicle in accordance with the requirements of Annex 7. Upon completion of such testing, the 18 kg blocks (and 10 kg block, if applicable) should not enter the passenger area.

This rather stringent requirement generally may not be met with many current automobiles. One alternative for meeting this requirement would be to reinforce the rearmost passenger seats with sheet metal. However, major drawbacks exist with this alternative, a few of which are that the sheet metal would add at least about 25 pounds to the weight of the automobile; it would be difficult and time consuming to design and test seat latch mechanisms which could withstand high enough loads under certain crash conditions; and retooling expenses would be very high.

Thus, it would be desirable to provide a load restraining barrier device which would advantageously pass applicable safety requirements. Further, it would be desirable to provide such a device which is aesthetically pleasing without a bulky frame(s), thereby advantageously being more lightweight. It would further be desirable to provide such a device which may be incorporated into current automotive designs with minimal changes thereto as an OEM part. Yet further, it would be desirable to provide such a device which is lightweight and relatively inexpensive to manufacture. Still further, it would be desirable to provide such a device which may be detached to advantageously provide pass-through cargo storage if desired. It is yet further desirable to provide such a device which, when detached, may fold easily and neatly into a small package for easy storage.

SUMMARY OF THE INVENTION

The present invention addresses and solves the above-mentioned problems by providing a frameless load restraining barrier device for use in a motor vehicle, the vehicle having a body with a passenger compartment/area and a cargo compartment/area rearward of the rear passenger seat(s), and an open space extending transversely between the cargo area and the passenger compartment above the seat back, the cargo compartment having a forward end, a bottom wall, and two opposed side walls extending substantially upwardly from the bottom wall. The barrier device comprises a barrier body having a predetermined geometric shape and disposed at the cargo forward end and suspended between the passenger compartment and the cargo compartment and across the open space, the barrier body having a front, a back, a top, a bottom, and two opposed sides, the front adapted to face the passenger compartment, the back adapted to face the cargo compartment, the top adapted to be adjacent the vehicle headliner, the bottom adapted to be adjacent the bottom wall, and the two opposed sides adapted to be adjacent the two opposed side walls and (adjacent the open space) the adjacent roof support pillar (such as, for example, the B pillar, the C pillar, etc.). Means are provided for attaching the top to the headliner, and means are also provided for releasably attaching the bottom to at least one of the bottom wall and the opposed side walls.

The barrier device of the present invention is intuitively engaged in the vehicle by the consumer. The device is installed at the cargo forward end and suspended between the passenger compartment and the cargo compartment and over the open space. Cargo of a predetermined mass in the cargo compartment may in some instances be substantially restrained from entering the passenger compartment under certain predetermined frontal crash conditions.

The present invention provides an apparatus and method for limiting movement of cargo between a passenger compartment and a cargo area of a vehicle wherein a seat back of the passenger compartment and an open space define a transition between the passenger compartment and the cargo area. The invention can include a flexible barrier body having a front, a back, a top, a bottom, a first side and a second side. The top, the bottom, the first side or the second side is defined by at least one flexible, substantially inelastic web strap. The barrier body is positionable at the transition between a seat back of a passenger compartment of a vehicle and a cargo area of the vehicle. The flexible barrier body can be positioned across an open space above the seat back. The invention also provides means for releasably attaching the top of the barrier body to the motor vehicle as well as means for releasably attaching the bottom of the barrier body to the motor vehicle. One of the attaching means engages the at least one web strap.

The barrier body can include two portions, a first portion having a number of layers and a second portion having a different number of layers. The portion having more layers can be adjacent the seat back or the open space. the barrier body can also include a window portion and a solid portion. The window portion can be adjacent the open space so a driver of the vehicle can see through the barrier body. The solid portion can be adjacent the seat back. The barrier body can also include a sleeve disposed on the top, bottom, first side or second side. The strap can pass through the sleeve.

The attaching means for the top of the barrier body or the bottom of the barrier body can include a member having at least one aperture that is vacant when the member is engaged with the vehicle. The aperture can reduce the weight of the invention. The member can include a pin and a key and be engageable with the barrier body. The pin can be inserted in an aperture defined in a pillar of the motor vehicle or a headliner of the motor vehicle, or both. The attaching means can also include a hook portion extending parallel or perpendicular to the web strap.

The invention can also include means for rendering the web strap taut. The rendering means can include a handle portion and first and second elastic portions. The first and second elastic portions can be individually disposed at opposite ends of the handle portion. At least one of the elastic portions can engage the web strap.

Other applications of the present invention will become apparent to those skilled in the art when the following description of the best mode contemplated for practicing the invention is read in conjunction with the accompanying drawings.

BRIEF DESCRIPTION OF THE DRAWINGS

Objects, features and advantages of the present invention will become apparent by reference to the following detailed description and drawings, in which.

DETAILED DESCRIPTION OF THE PREFERRED EMBODIMENTS

Figure 1:
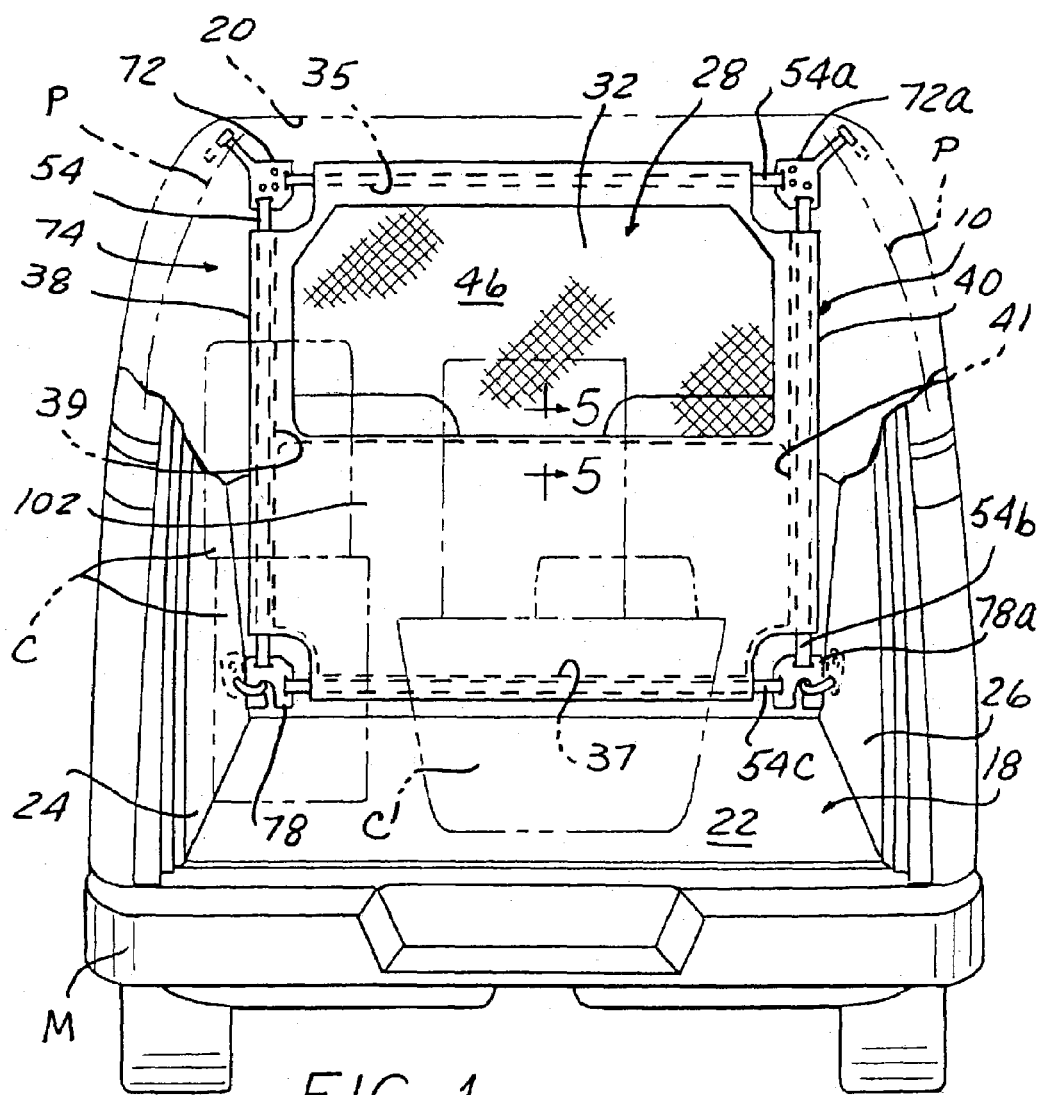
FIG. 1 is a partially cutaway rear view showing the frameless barrier device of the present invention installed within a motor vehicle.
Figure 2:
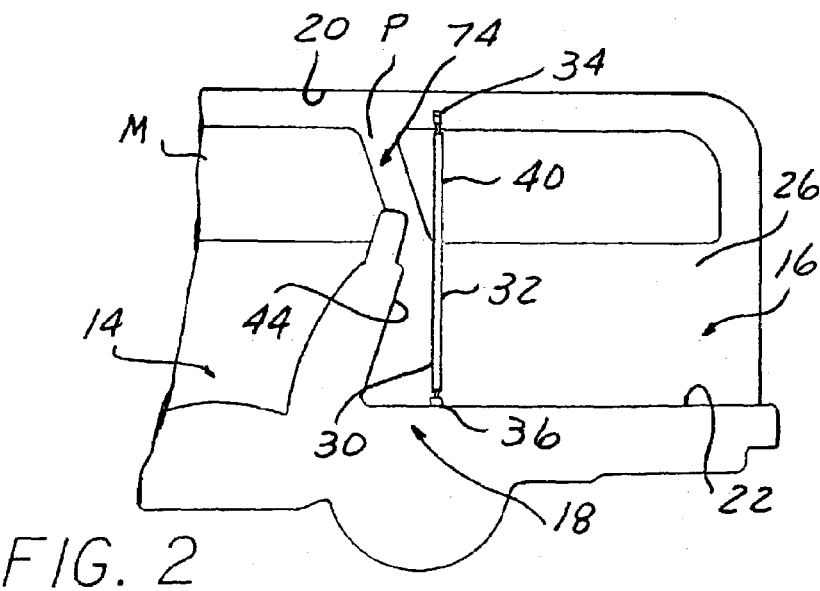
FIG. 2 is a cutaway schematic side view showing the device of the present invention installed within a vehicle.

Referring now to FIGS. 1 and 2, the barrier device of the present invention is designated generally as 10. Load restraining barrier device 10 is for use in a motor vehicle, including but not limited to automobiles (including SUVs and the like), trucks, trains, aircraft, marine craft, and the like. Motor vehicle M as shown in the drawings represents an automobile, specifically a station wagon, minivan, or a sport utility vehicle, having a cargo area 16 located behind a seat back 44 and a passenger compartment 14 located forwardly of the seat back. An open space 74 extends transversely between the cargo area 16 and the passenger compartment 14 above the seat back 44, and the inventive barrier net 10 extends across the open space 74 and behind the seat back 44 to substantially restrain, in certain instances, stowage or cargo C within the cargo area 16 from entering the passenger compartment 14.

The barrier device 10 is positionable in the motor vehicle M having a passenger compartment 14 in communication with a cargo area 16, wherein a seat back 44 of the passenger compartment 14 and an open space 74 define a transition between the passenger compartment 14 and the cargo area 16. The open space 74 extends transversely between the cargo area 16 and the passenger compartment 14 above the seat back 44. The barrier device 10 extends across the open space 74 and behind the seat back 44 to substantially restrain stowage or cargo C (shown in phantom) within the cargo area 16 from entering the passenger compartment 14 and/or from striking the seat back 44.

"Frameless" within the context of the present invention is described as meaning that the barrier device is not surrounded by a rigid or substantially rigid frame composed of, for example, metals (eg. aluminum extrusions), plastic rods, wood, any other substantially rigid material, and the like.

The cargo compartment 16 has a forward end 18, a bottom wall 22, and two opposed side walls 24, 26 extending substantially upwardly from the bottom wall 22.

The barrier device 10 comprises a barrier body 28 having a predetermined shape and adapted to be disposed at the cargo forward end 18 and suspended between the passenger compartment 14 and the cargo compartment 16 and across the open space 74. Barrier body 28 may be of any size and/or shape, including but not limited to square, rectangular, trapezoidal, and/or any geometric shape as desired and/or necessitated by the particular vehicle into which barrier device 10 will be installed.

The barrier body 28 has a front 30, a back 32, a top 34, a bottom 36, and two opposed sides 38, 40. As best seen in FIGS. 1 and 2, the front 30 is adapted to face the passenger compartment 14, and the back 32 is adapted to face the cargo compartment 16. The top 34 is adapted to be adjacent the headliner 20, the bottom 36 is adapted to be adjacent the bottom wall 22, and the two opposed sides 38, 40 are adapted to be adjacent the two opposed side walls 24, 26 and (adjacent the open space 74) the adjacent roof support pillar P (such as, for example, the B-pillar, the C-pillar, etc.)

The barrier body 28 further comprises an upper 35, lower 37 and two opposed side sleeves 39, 41. Within sleeves 35, 37, 39 and 41 is fixed and/or slidably received flexible, substantially inelastic web strap 54. It is to be understood that this web strap 54 may be formed from any suitable material, such as for example from polyesters, polypropylenes, nylons, and mixtures thereof; however, in the preferred embodiment, the material of choice is a reinforced multi-filament polypropylene.

The barrier body 28 is positionable at the transition between the seat back 44 of the passenger compartment 14 and the cargo area 16, at the forward end 18 of the cargo area 16, and across the open space 74. The two opposed sides 38, 40 can also be adapted to be adjacent a roof support pillar P, such as, for example, the B-pillar or the C-pillar. In FIG. 2, an opposed side 40 is shown substantially adjacent a pillar P. The barrier body 28 is flexible and can be folded for storage when not engaged with a motor vehicle.

Figure 8A:
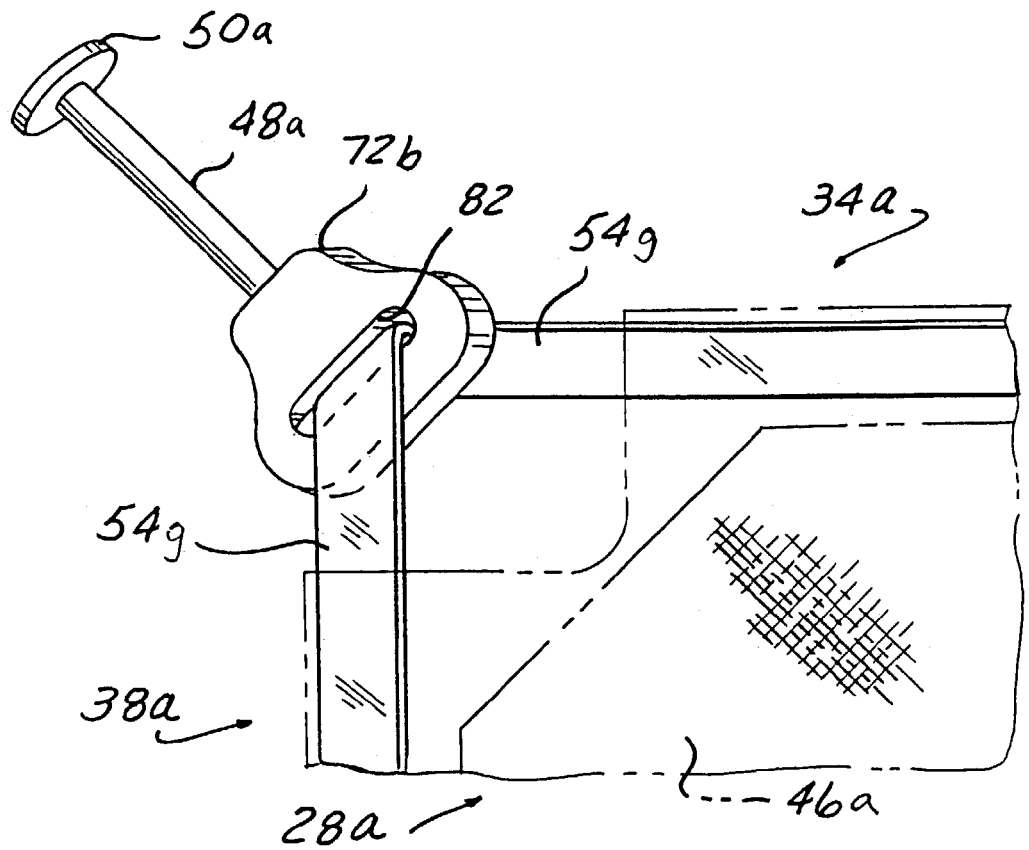
FIG. 8A is an enlarged, cutaway perspective view of an alternate embodiment of the key member for the upper attaching means.
Figure 8B:
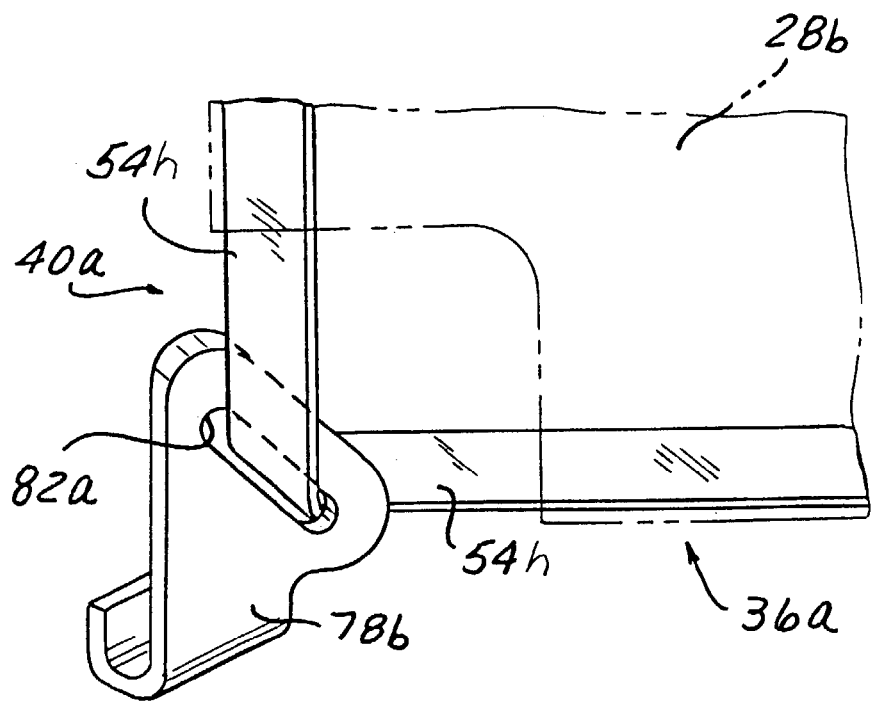
FIG. 8B is an enlarged, cutaway perspective view of a further alternate embodiment of the hook for the lower attaching means.

FIG. 1 shows a barrier body 28 including sleeves 39, 41, 35 and 37 disposed on the first side 38, second side 40, top 34 and bottom 36, respectively. One of the top 34, the bottom 36, the first side 38 and the second side 40 is defined by at least one flexible, substantially inelastic web strap 54. The barrier device 10 can include web straps on less than all four sides of the barrier device 10. FIG. 1 shows an embodiment of the device 10 including four straps 54, 54a, 54b and 54c individually defining the first side 38, the top 34, the second side 40 and the bottom 36. The straps 54, 54a, 54b and 54c individually pass through sleeves 39, 35, 41 and 37. In FIGS. 8A and 8B, straps 54g and 54h can define more than one side of the barrier body 28. Specifically, as shown in FIG. 8A, the strap 54g defines a top 34a and a first side 38a of a barrier body 28a. In FIG. 8B, the strap 54h defines a bottom 36a and a second side 40a of a barrier body 28b. In FIGS. 8A and 8B, straps 54g and 54h pass through more than one sleeve (shown in phantom).

Figure 6:
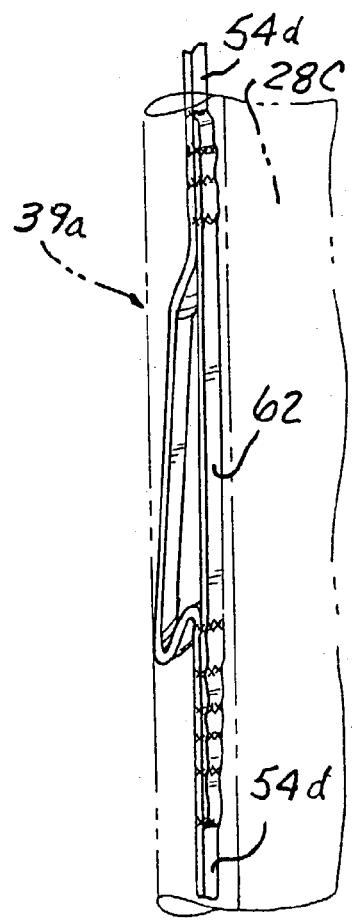
FIG. 6 is an enlarged, cutaway perspective view showing an elastic tensioning means attached to the web strap within the sleeve (in phantom)

Referring now to FIG. 6, the web strap 54d within any or all of sleeves 39a (shown in phantom) may include a tensioning means. The tensioning means may be at any area along the web strap, however, in the preferred embodiment, it is in an area near the middle of the respective edge (upper, lower, sides). The tensioning means acts to allow for a predetermined amount of stretch/tension to the adjacent edge area, thereby providing a taut fit to the device 10 when installed in the vehicle M. This may aid in preventing undesirable disengagement of the device, and may further provide an aesthetically pleasing appearance of the device.

In a preferred embodiment, the tensioning means may comprise an elastic member 62 attached to the web strap(s) 54d and a handle portion 63. Elastic member 62 may comprise any suitable material and be any suitable size, shape and/or configuration. Elastic member 62 may keep barrier body 28c taut when attached and during normal driving conditions; yet yields enough that a consumer may easily attach/detach device 10 in vehicle M. Elastic member 62 provides a predetermined amount of transverse and/or longitudinal elasticity, depending upon within which sleeve it is. FIG. 6 shows elastic member 62 as it may appear when device 10 is partially detached from vehicle M, and/or not attached at all (however, if the vehicle dimensions are smaller, elastic member 62 may appear as in FIG. 6 when device 10 is fully installed). As can be seen in FIG. 6, elastic member 62 is not essentially parallel to web strap 54d (as it would be when fully tensioned), but rather spaced a predetermined distance from web strap 54d.

It is to be understood that the web strap 54 may be optional in that it is contemplated as being within the purview of the present invention to effectively attach the barrier body (without web strap) directly to the vehicle M.

The barrier device 10 further comprises means adapted to releasably attach the top 34 to the headliner 20; and means adapted to releasably attach the bottom 36 to the bottom wall 22 and/or the opposed side walls 24, 26 (for example, the shock tower walls).

When the barrier device 10 is installed at the cargo forward end 18 and suspended between the passenger compartment 14 and the cargo compartment 16 and across the open space 74, cargo C of a predetermined mass in the cargo compartment 16 may in certain circumstances be substantially restrained from entering the passenger compartment 14 under predetermined frontal crash conditions. The barrier device 10 of the present invention may advantageously meet the requirements of the U.N. Regulation No. 17 as described hereinabove, ie. device 10 may restrain cargo C comprising two blocks, each having a mass of 18 kg, and a third block having a mass of 10 kg, wherein the frontal crash conditions include the speed on impact being between about 48.3 km/h and about 53.1 km/h, and a longitudinal horizontal deceleration of not less than about 20 g being applied for 30 milliseconds in the forward direction to motor vehicle.

Figure 5:
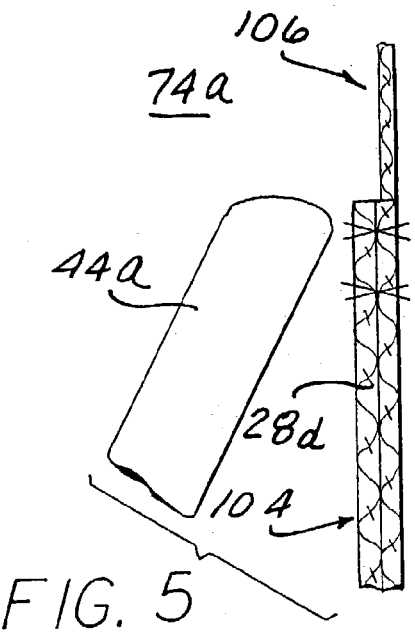
FIG. 5 is an enlarged, cutaway cross sectional view taken on line 5—5 of FIG. 1.

It is to be understood that barrier body 28d may be made of one or multiple layers of a desired material. For example, as can best be seen in FIG. 5, the front and back of the barrier body 28d are double ply in the area behind the rear seat back 44a. However, in the area traversing open space 74a, the front and back of the barrier body 28d are single ply.

The barrier body 28d can also include a first portion 104 having a first predetermined number of layers of material and a second portion 106 having a second predetermined number of layers of material, wherein the first predetermined number is greater than the second predetermined number. For example, the portion 104 of the barrier body 28d can include more layers of material than a portion 106 of the barrier body 28d. The portion 104 is shown as generally double-ply and the portion 106 is shown as generally single-ply. However, the first and second predetermined numbers can be selected in response to the strength of the material selected for forming each layer and the desired strength of the barrier body 28d. For example, the barrier body 28*d* can be formed wherein the first portion 104 includes three or more layers and the second portion 106 includes two or more layers. The portion 104 of the barrier body 28*d* having more layers of material can be disposed adjacent a seat back 44*a*. The portion 106 of the barrier body 28*d* having relatively fewer layers of material can extend across, or be adjacent to, the open space 74*a*. Alternatively, the portion 104 of the barrier body 28*d* having more layers of material can be disposed across, or be adjacent to, the open space 74*a* and the portion 106 of the barrier body 28*d* having relatively fewer layers of material can be disposed adjacent the seat back 44*a*. Disposing the portion 104 adjacent the seat back 44*a* can be desirable where it is expected that cargo of greatest mass will be positioned adjacent the seat back 44*a*. Disposing the portion 104 across the open space 74*a* can be desirable where it is expected that cargo of significant mass will be positioned adjacent the open space 74*a* and the seat back 44*a* will cooperate with the portion 106to limit shifting of cargo toward the passenger compartment.

The barrier body 28 may be formed from a natural or synthetic cloth material, as shown in FIGS. 1 and 8A, 8B. It is to be understood that this cloth material may be formed from any suitable material. However, in the preferred embodiment, the cloth material is selected from the group consisting of polyesters, polypropylenes, nylons, and mixtures thereof. It is more preferred that the cloth material be formed from a polypropylene material. Such cloth material may be die cut, woven, and/or formed by any other suitable process.

In a more preferred embodiment, each of the web straps 54 is formed from a reinforced multi-filament polypropylene material, and the barrier body 28 is formed from a polypropylene cloth material. This embodiment additionally is advantageous in that, due to the various polypropylene materials used, it is more environmentally friendly.

Referring now to FIG. 1 and FIG. 8A, barrier body 28, 28*a* comprises a window 46, 46*a* formed from a mesh netting material. The netting material mesh is similar to that of a screen door; however, the netting material window 46 may be much stronger than conventional screen door material. It is to be understood that the netting material may be formed by at least one of woven, knitted, rochelle, and weft insertion processes, provided that the resultant netting material is sufficiently strong to withstand predetermined loads. If a woven material, it is preferred that such material be of a relatively small mesh, eg. having small (1–2 mm) openings.

The barrier body 28 can include the window 46 defined by a mesh. The mesh can be a screen so that a driver of the motor vehicle can see through the window 46. The window 46 of the barrier body 28 can be positionable across the open space 74. The window 46 is operable to withstand predetermined loads to prevent cargo from moving to the passenger compartment 14.

Barrier body 28 can include a substantially solid portion 102 adjacent the window portion 46. The substantially solid portion 102 can be positionable adjacent the seat back 44. The substantially solid portion 102 can be formed by at least one of woven, knitted, rochelle, and weft insertion processes. The substantially solid portion 102 can be operable to withstand predetermined loads to prevent cargo from striking the seat back 44.

Figure 4:
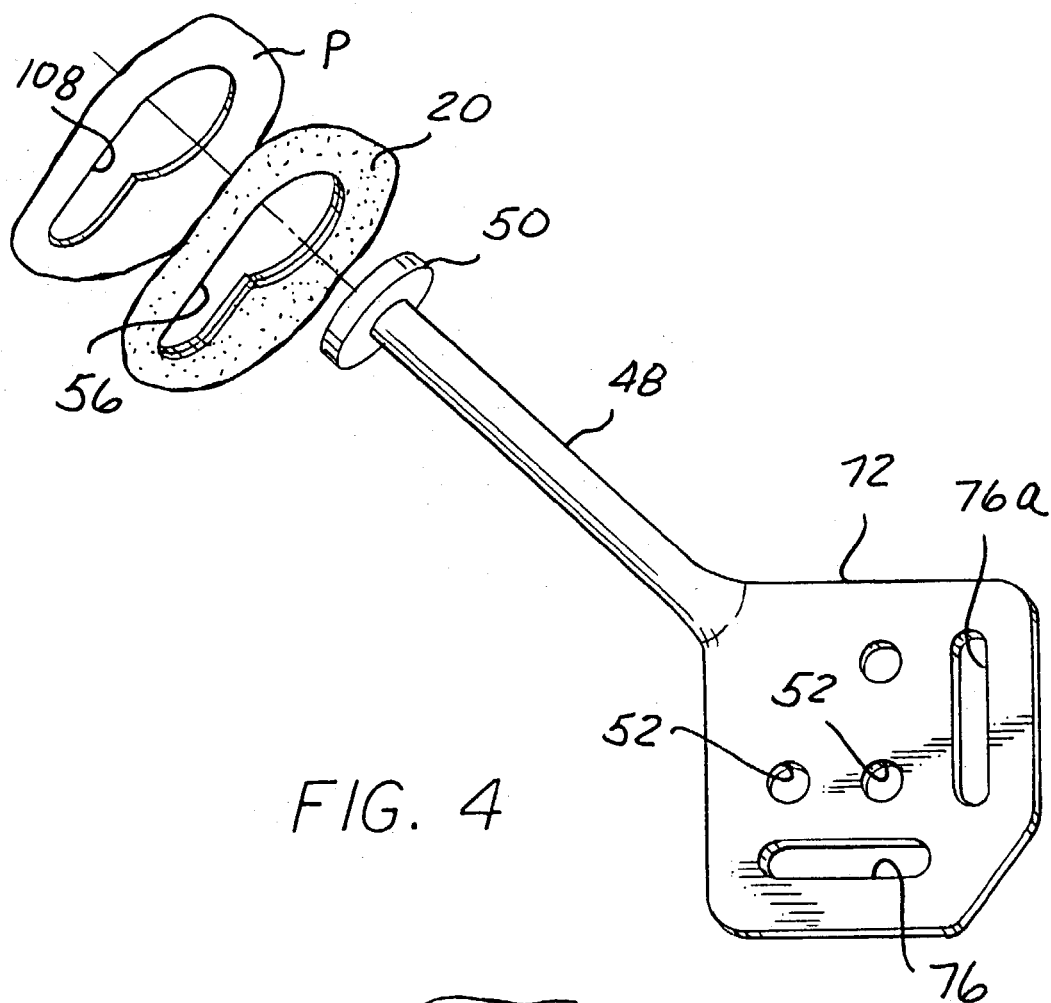
FIG. 4 is an enlarged, exploded cutaway perspective view of a preferred embodiment of the upper attachment means.

It is to be understood that the top attaching means may comprise any suitable means. Referring now to FIGS. 1 and 4, in the preferred embodiment, this top attaching means comprises at least two key members 72, 72*a* each having web strap receiving slots 76, 76*a* turned substantially 90° from each other (as seen in FIG. 4). Slot 76 receives an end of web strap 54 within sleeve 39, and slot 76*a* receives an end of web strap 54*a* within sleeve 35. Key members 72 further comprise a rod 48 terminating in a key 50. Key members 72 may further optionally have bores 52 for reducing the weight of key member 72.

It is to be understood that rod 48 and key 50 may be of any suitable size, shape and/or configuration. However, rod 48 should be long enough to extend through the interior trim and insulation (if any) within vehicle M to reach the roof support pillar P. In a preferred embodiment, rod 48 is cylindrical, has a diameter of about 8 mm and a length of about 70 mm; and key 50 is a round, disk shape having a diameter of 18 mm. Key member 72 is formed from a suitable grade of steel, or any other suitably strong material.

It is to be understood that these dimensions are for illustrative purposes—predetermined dimensions, shapes, and/or angles may be any as desired and/or necessitated by the particular configuration of the motor vehicle into which the device 10 is to be installed.

As seen in FIG. 1 and as best seen in FIG. 4, the top attaching means is adapted to be releasably engaged within the sheet metal of the roof support pillar P via coupling between key 50 and key slot 108.

The headliner 20 can define a slot 56 adjacent to the slot 108 of the pillar P. The key 50 can be inserted with respect to the slots 56 and 108 to engage the pillar P.

Figure 3:
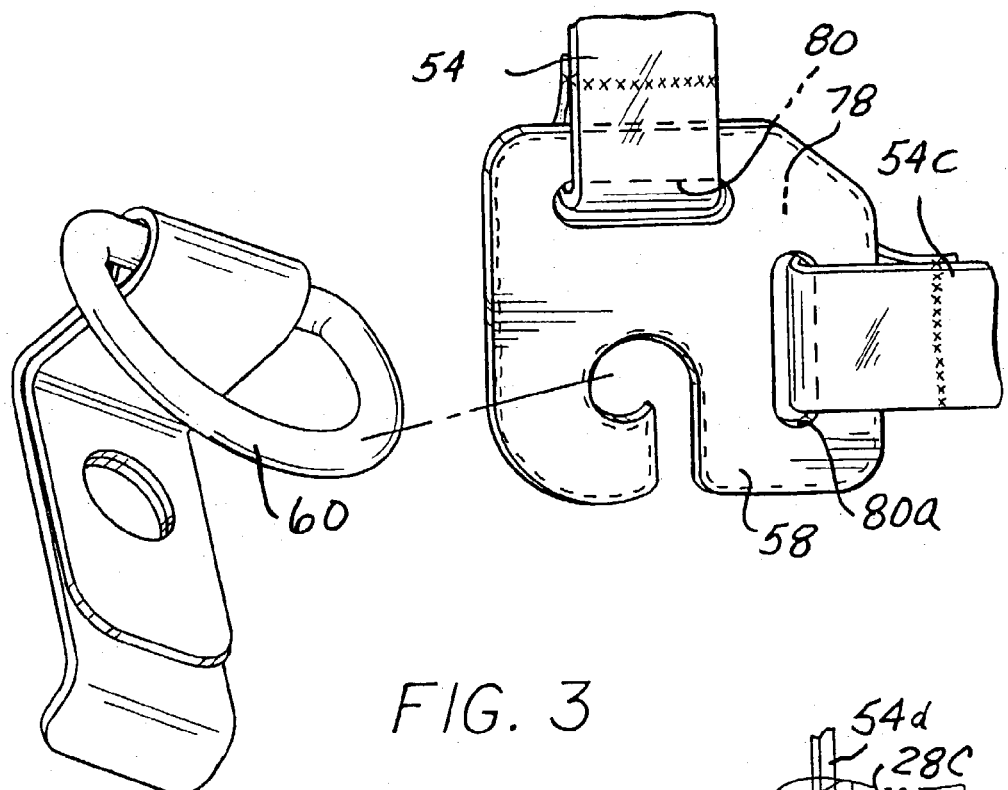
FIG. 3 is an enlarged, exploded cutaway perspective view of a preferred embodiment of the lower attachment means.

FIG. 3 depicts a preferred embodiment of the bottom attaching means. Bottom attaching means comprises a hook 78. Hook 78 has slots 80, 80*a* similar to those described above in relation to key member 72. As can be seen in FIG. 3, after the web strap 54 passes through slot 80 it is fastened as desired, for example by stitching to itself (as shown). As with key member 72, lower hook 78 is formed from a suitable grade of steel, or from any other suitably strong material.

Lower hook 78 is releasably attachable to at least one of the bottom wall 22 and the opposed side walls 24, 26 via any suitable means, such as loop member 60. If loop members 60 are on the side walls 24, 26 (as shown in FIG. 1), members 60 should preferably be adjacent bottom wall 22. Similarly, if loop members 60 are on the bottom wall 22, they should preferably be adjacent the respective side wall 24, 26. Loop member 60 is preferably formed from a suitably strong material, such as steel, for example.

Any or all of hooks 78, 78*a* and key members 72, 72*a* (including any of the alternate embodiments described herein) may optionally be plated or the like; and/or molded plastic or rubber jackets 58 (shown in phantom) may be placed over the metal (see FIG. 3). Jacket 58 may be for aesthetic purposes, to help prevent rattle, and the like. Further, utilitarian and/or ergonomic characteristics may be incorporated into jacket 58, such as for example, "grip" indicators.

Figure 7:
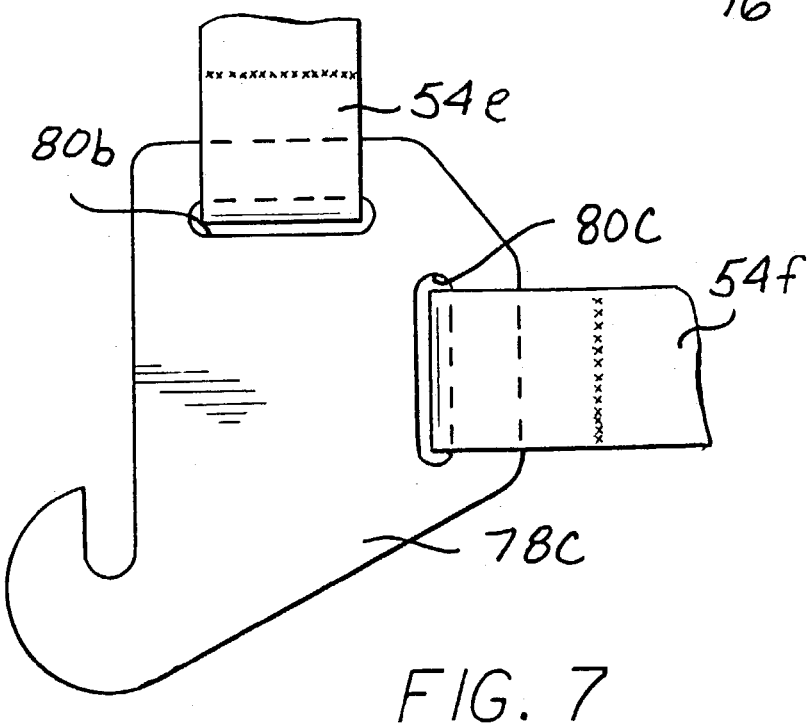
FIG. 7 is an enlarged, cutaway front view of an alternate embodiment of the hook for the lower attaching means.

An alternate embodiment of the lower hook 78 is designated 78*c* in FIG. 7. Hook 78*c* functions similarly to that of hook 78 in FIG. 3, however the hook portion of hook 78*c* extends outwardly away from the main body of hook 78*c*, whereas the hook portion of hook 78 is incorporated within the main body of hook 78.

The hook 78*c* includes slots 80*b*, 80*c* for receiving straps 54*e*, 54*f*. Each web straps 54*e*, 54*f* can pass through slots 80*b*, 80*c* and can be fastened as desired, for example by stitching to itself (as shown). As with hook 78, hook 78*c* is formed from a suitable grade of steel, or from any other suitably strong material.

An alternate embodiment of the key member 72 is designated in FIG. 8A as 72b. Key member 72b includes key 50a, pin 48a has only one slot 82 through which one continuous web strap 54g extends. Similarly, a further alternate embodiment of lower hook, 78b, in FIG. 8B has only one slot 82a through which the continuous web strap 54h extends. This embodiment may be advantageous in that manufacture of the device 10 may be simpler.

It is to be understood that one or multiple layers of web strap may be secured through slots 76, 76a, 80a, 80b, 80c, 82, 82a.

It is to be further understood that the upper and/or lower attachment means may be fixed, semi-fixed, or detachable (as shown), and that any other suitable upper and lower attachments means are contemplated as being within the purview of the present invention.

Yet further, it is to be understood that the embodiments shown, though preferred, are illustrative only. As such, it is to be understood that various features (including, but not limited to the absence or presence of various web straps, various attachment means, both upper and lower attachment, materials used, etc.) of all the embodiments shown may be mixed and/or matched to render yet other embodiments, which embodiments are contemplated as being within the scope of the present invention.

The entire disclosure of the prior provisional application, Ser. No. 60/337,588, filed Nov. 12, 2001, is considered part of the disclosure of this non-provisional application and is hereby incorporated by reference.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A barrier device for limiting movement of cargo between a passenger compartment and a cargo area of a vehicle wherein a seat back of the passenger compartment and an open space bounded by an upper edge of the seat back and an interior roof surface of the vehicle define a transition between the passenger compartment and the cargo area, the device comprising:
   a flexible barrier body including a flexible, substantially inelastic web strap forming a continuous uninterrupted loop; and
   means for releasably attaching the barrier body to the vehicle at a plurality of locations, wherein at least one of the attaching means is slidably engageable along a continuous length of the web strap and the web strap extends linearly along a substantially straight path between each successive attaching means when the barrier body is attached to the vehicle.

2. The barrier device according to claim 1 wherein the barrier body further comprises:
   a first portion having a first predetermined number of layers; and
   a second portion having a second predetermined number of layers, wherein the first predetermined number is greater than the second predetermined number.

3. The barrier device according to claim 2 wherein the first portion is disposed adjacent the seat back.

4. The barrier device according to claim 2 wherein the first portion is disposed across the open space.

5. The barrier device according to claim 1 wherein the barrier body further comprises:
   a window portion defined by a mesh.

6. The apparatus of claim 5 wherein the window portion of the barrier body is positionable across the open space.

7. The barrier device according to claim 5 wherein the barrier body further comprises:
   a substantially solid portion adjacent the window portion.

8. The barrier device according to claim 7 wherein the substantially solid portion is positionable adjacent the seat back.

9. The barrier device according to claim 1 wherein the barrier body further comprises:
   at least one sleeve disposed along at least one edge of the barrier body, wherein the web strap is slidably disposed within the at least one sleeve.

10. The barrier device according to claim 1 wherein the releasable attaching means further comprises:
    a member having at least one aperture that is vacant when the member is engaged with the vehicle.

11. The barrier device according to claim 1 wherein at least one of the releasable attaching means comprises:
    a member including a pin and a key, the member engageable with the barrier body; and
    an aperture defined in a body of the vehicle, wherein the key and the pin are insertable in the aperture.

12. The barrier device according to claim 1 wherein at least one of the releasable attaching means comprises:
    a hook portion extending substantially parallel to the web strap.

13. The barrier device according to claim 1 wherein at least one of the releasable attaching means comprises:
    a hook portion extending substantially perpendicular to the web strap.

14. The barrier device according to claim 1 further comprising:
    means for rendering the flexible, substantially inelastic web strap taut.

15. A barrier device for limiting movement of cargo between a passenger compartment and a cargo area of a vehicle wherein a seat back of the passenger compartment and an open space define a transition between the passenger compartment and the cargo area, the device comprising:
    a flexible barrier body having a front, a back, a top, a bottom, a first side and a second side, wherein one of the top, the bottom, the first side and the second side are defined by at least one flexible, substantially inelastic web strap and the barrier body is positionable at the transition between the seat back of the passenger compartment and the cargo area and across the open space;
    first means for releasably attaching the top of the barrier body to the vehicle;
    second means for releasably attaching the bottom of the barrier body to the vehicle, wherein one of the first releasable attaching means and the second releasable attaching means is slidably engageable with the at least one web strap;
    means for rendering the at least one flexible, substantially inelastic web strap taut;
    a handle portion; and
    first and second elastic portions individually disposed at opposite ends of the handle portion, wherein at least one of the first and second elastic portions engage the at least one flexible, substantially inelastic web strap.

16. A barrier device for limiting movement of cargo between a passenger compartment and a cargo area of a vehicle wherein a seat back of the passenger compartment and an open space define a transition between the passenger compartment and the cargo area, the device comprising:

a flexible barrier body having at least one edge defined by at least one flexible, substantially inelastic web strap, the barrier body being positionable at the transition between the seat back of the passenger compartment and the cargo area and across the open space, the barrier body including a first portion having a first predetermined number of layers and a second portion having a second predetermined number of layers, the first predetermined number being greater than the second predetermined number, a window portion defined by a mesh, and a substantially solid portion adjacent the window portion;

first means for releasably attaching a top of the barrier body to the vehicle including a substantially inelastic member engageable with the barrier body and having a pin and a key, the first attaching means attached to at least one of the at least one web strap;

second means for releasably attaching a bottom of the barrier body to the vehicle including a substantially inelastic member engageable with the barrier body and having a hook portion, the second attaching means attached to at least one of the at least one web strap, wherein the first attaching means and the second attaching means are slidably engageable along a continuous length of at least one of the at least one web strap.

17. A barrier for restricting movement of cargo within a vehicle, comprising:

a flexible barrier body having a plurality of edges;

a plurality of sleeves disposed along the edges of the barrier body, each edge of the barrier body having at least one said sleeve;

at least one flexible substantially inelastic web strap having a first end and a second end, the web strap slidably disposed within at least one of the sleeves; and means for releasably attaching the at least one web strap to the vehicle at a plurality of locations, the first and second ends of the at least one web strap directly attached to at least one of the attaching means.

18. The barrier of claim 17, wherein at least one of the at least one web strap is disposed adjacent to at least two of the edges of the barrier body.

19. The barrier of claim 17, wherein each web strap is disposed adjacent to only one of the plurality of edges.

20. The barrier of claim 17, wherein at least one of the attaching means comprises:

at least one connecting member including a pin and a key, and at least one aperture defined in a body of the vehicle, wherein the pin and key are engageable with the aperture.

21. The barrier of claim 17, wherein at least one of the attaching means comprises:

a hook member comprising a slot and an aperture defined by a substantially planar body, the slot having one end intersecting an edge of the planar body and another end intersecting the aperture such that a geometric center of the aperture is laterally displaced from a longitudinal axis of the slot; and a loop member attached to a body of the vehicle, the loop member engageable with the slot and aperture of the hook member.

22. The barrier of claim 17, wherein at least one of the attaching means comprises:

a loop member attached to a body of the vehicle, and a hook member having a substantially planar body and a substantially planar finger extending from an edge of the planar body, an edge of the finger and the edge of the planar body defining a slot engageable with the loop member.

23. The barrier of claim 17, wherein at least one of the attaching means is slidably engageable along a continuous length of at least one of the at least one web strap.

24. The barrier of claim 17, wherein the attaching means are located at each corner of the barrier defined between adjacent edges of the barrier.

25. The barrier of claim 20, wherein at least one of the at least one web strap has only one of the first and second ends directly attached to the at least one connecting member.

26. The barrier of claim 20, wherein at least one of the at least one web strap has both the first and second ends of the at least one web strap attached to at least one of the at least one connecting member.

27. The barrier of claim 20, wherein the at least one web strap comprises a first connecting strap having two ends, only one of the two ends of the first connecting strap being directly connected to the at least one connecting member, and a second connecting strap having two ends, both ends of the second connecting strap being directly connected to the at least one connecting member.

28. The barrier of claim 21, wherein at least one of the at least one web strap has only one of the first and second ends directly attached to the at least one hook.

29. The barrier of claim 21, wherein at least one of the at least one web strap has both the first and seconds ends of the at least one web strap attached to the hook member.

30. The barrier of claim 21, wherein the at least one web strap comprises a first connecting strap having two ends, only one of the two ends of the first connecting strap being directly connected to the hook member, and a second connecting strap having two ends, both ends of the second connecting strap being directly connected to the hook member.

31. The barrier of claim 22, wherein at least one of the at least one web strap has only one of the first and second ends directly attached to the hook member.

32. The barrier of claim 22, wherein at least one of the at least one web strap has both the first and seconds ends of the at least one web strap attached to at least one of the hook member.

33. The barrier of claim 22, wherein the at least one web strap comprises a first connecting strap having two ends, only one of the two ends of the first connecting strap being directly connected to the hook member, and a second connecting strap having two ends, both ends of the second connecting strap being directly connected to the hook member.

34. The barrier of claim 17 further comprising an elastic member having a first end and a second end, the first end of the elastic member attached to one of the at least one web strap at a position located between the first and second ends of the one web strap, and the second end of the elastic member attached to the same web strap at a position located between the point of attachment of the first end of the elastic member to the web strap and the second end of the web strap.

35. The barrier of claim 34, wherein a length of the elastic member in a fully retracted position, measured between the points of attachment of the first and second ends of the elastic member to the web strap, is less than a length of the web strap measured between the same points of attachment.

* * * * *